US00RE42986E

(19) United States
(12) Reissued Patent
Kanehisa

(10) Patent Number: US RE42,986 E
(45) Date of Reissued Patent: Dec. 6, 2011

(54) BICYCLE DISC BRAKE HUB

(75) Inventor: Takanori Kanehisa, Osaka (JP)

(73) Assignee: Shimano Inc., Osaka (JP)

(21) Appl. No.: 10/347,791

(22) Filed: Jan. 22, 2003

Related U.S. Patent Documents

Reissue of:
(64) Patent No.: 6,371,252
Issued: Apr. 16, 2002
Appl. No.: 09/941,737
Filed: Aug. 30, 2001

(51) Int. Cl.
*B62L 5/00* (2006.01)

(52) U.S. Cl. ..... 188/26

(58) Field of Classification Search ..... 192/46, 192/64; 188/24.17, 26; 74/594.1; 301/6.8
See application file for complete search history.

(56) References Cited

U.S. PATENT DOCUMENTS

| | | | | |
|---|---|---|---|---|
| 952,041 | A * | 3/1910 | Hancock | 192/217.3 |
| 4,226,310 | A * | 10/1980 | Ozaki | 192/6 R |
| 4,840,084 | A * | 6/1989 | Durham | 74/594.1 |
| 5,194,051 | A | 3/1993 | Nagano | |
| 5,243,879 | A | 9/1993 | Nagano | |
| 5,673,773 | A * | 10/1997 | Lai | 188/24.17 |
| 6,065,580 | A | 5/2000 | Kirk | |
| 6,123,179 | A * | 9/2000 | Chen | 192/64 |
| 6,206,144 | B1 | 3/2001 | Di Bella | |
| 6,244,405 | B1 * | 6/2001 | Chen | 192/64 |
| 6,336,531 | B1 | 1/2002 | Chou | |
| 6,386,328 | B1 | 5/2002 | Chen | |
| 7,216,743 | B2 * | 5/2007 | Takizawa et al. | 188/26 |
| 7,367,632 | B2 * | 5/2008 | Chang | 301/6.8 |

FOREIGN PATENT DOCUMENTS

| | | | |
|---|---|---|---|
| DE | 199 15 714 | A1 | 10/2000 |
| EP | 0194551 | A2 | 9/1985 |
| FR | 2 752 773 | | 3/1998 |
| JP | S54-83161 | | 11/1979 |
| JP | S59-86724 | | 5/1984 |
| JP | S61-204031 | | 12/1986 |
| JP | H11-315866 | | 11/1999 |
| WO | WO 00/61388 | A1 | 10/2000 |

OTHER PUBLICATIONS

Killer BeeBees-Schuldt brochure, Eurobike 98 Trade Fair.
Zweirad Magazin, Jan./Feb. 1999, Germany.
SRAM Dealer Technical Manual 2001.
1998 Formula; ten pages (1-8 and 23-25); available on or prior to Sep. 9, 1997 in the United States.
Shimano Dealers' 1990 Product Manual, Aug. 1989, Japan, p. 64.
Formula Brochure—Lightness: Power: Simpleness distributed at Interbike Las Vegas Show 2000; 6 pages.

* cited by examiner

*Primary Examiner* — Christopher P Schwartz
(74) *Attorney, Agent, or Firm* — Global IP Counselors, LLP

(57) ABSTRACT

A bicycle disc brake hub is provided with a brake rotor attachment portion having an external surface with an external spline section and an annular internal surface with internal threads, and a locking ring having a center tubular section with external threads and an abutment flange extending outwardly from the center tubular section to form an axially facing retaining surface. The external threads of the center tubular section mates with the internal threads of the brake rotor attachment portion to secure a rotor mounting boss and a brake rotor thereto. In one embodiment, the brake rotor is held between the locking ring and the rotor mounting boss, while in a another embodiment, the brake rotor is riveted to the rotor mounting boss.

43 Claims, 17 Drawing Sheets

(Amended)

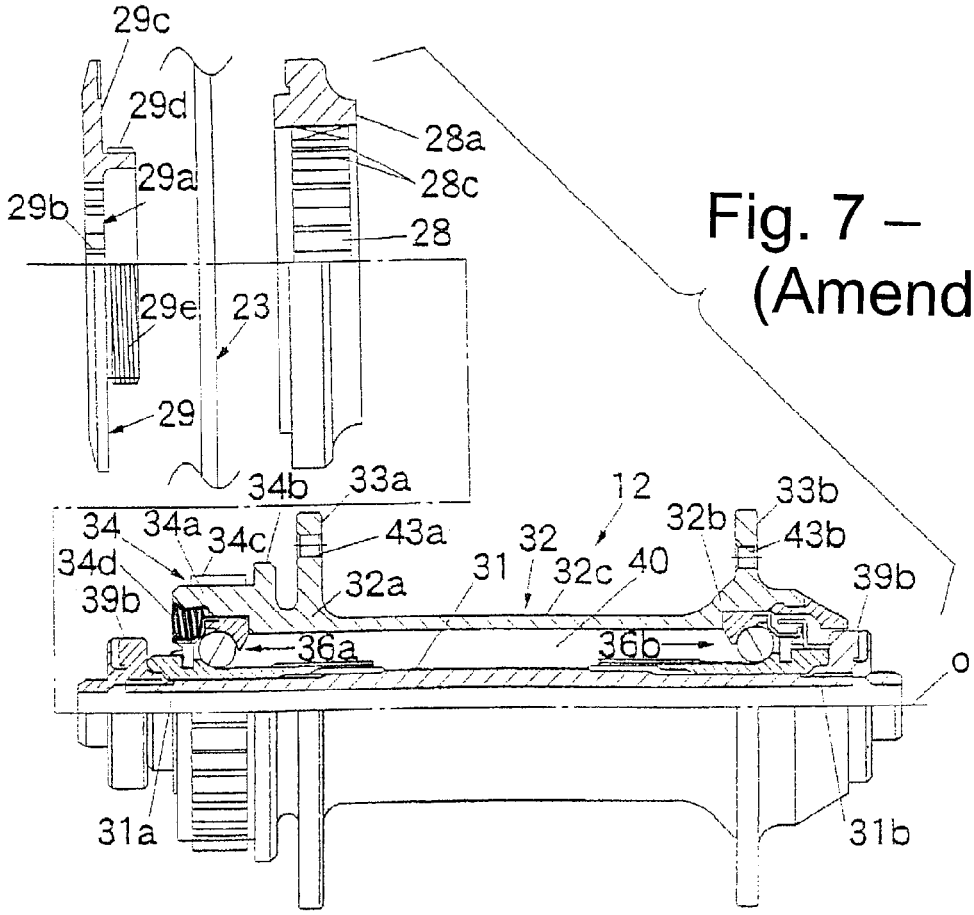
Fig. 7 – (Amended)
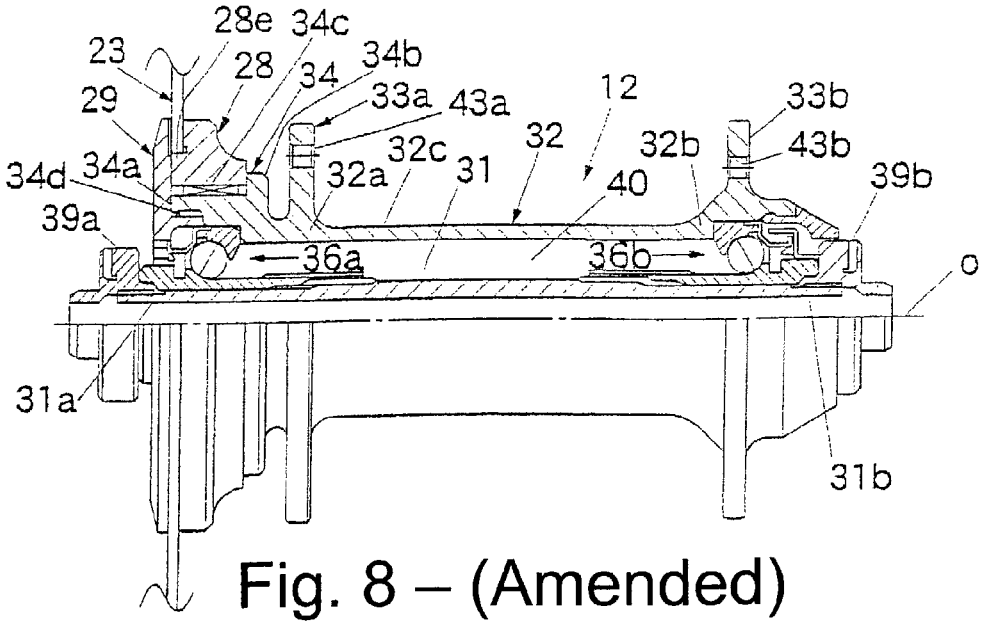
Fig. 8 – (Amended)

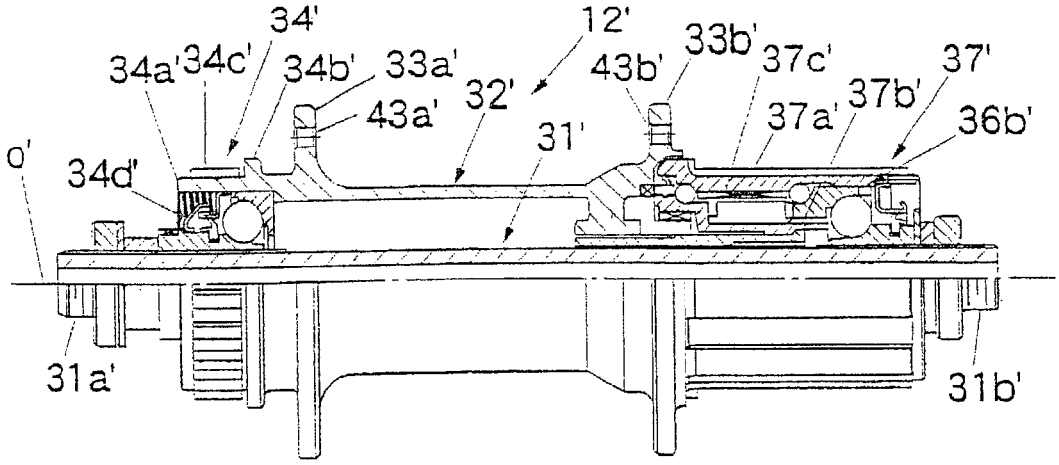
Fig. 19 – (Amended)
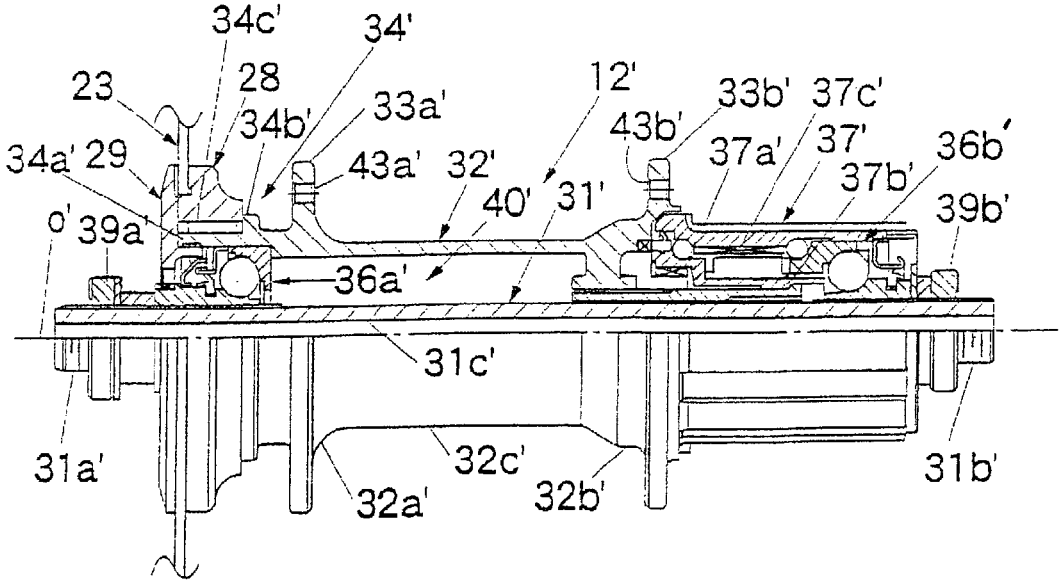
Fig. 20 – (Amended)

BICYCLE DISC BRAKE HUB

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to a bicycle disc brake hub. More specifically, the present invention relates a bicycle disc brake hub in which the brake rotor mounted on a splined section of the hub shell.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle which has been extensively redesigned over the past years is the bicycle braking system.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions.

Typically, a brake disc assembly for a bicycle includes a caliper mounted on the bicycle frame and operatively coupled to a brake lever, and a disc brake rotor fixedly coupled to the hub of the wheel of the bicycle. The disc brake rotor has been coupled to the hub of the wheel in several different ways. For example, a brake rotor attachment flange is often provided for bolting the disc brake rotor to the hub. Alternatively, as shown in U.S. Pat. No. 6,206,144 to Di Bella, the hub has splines at one end that a boss part is non-rotatably mounted thereon and secured by a locking ring. One problem with the latter method of attaching the disc brake rotor to the hub is that the external seat may become damaged such that the locking ring cannot be installed thereon. One problem with this type of mounting method is that the brake rotor attachment portion can often be difficult to manufacture and/or install the brake rotor thereon.

In view of the above, there exists a need for an improved bicycle disc brake hub which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle disc brake hub that is relatively is reliable and durable so that the disc brake rotor can be easily installed on the hub even after extensive use.

Another object of the present invention is to provide a bicycle disc brake hub that is relatively lightweight.

Still another object of the present invention is to provide bicycle disc brake hub that is relatively compact in overall construction.

Yet another object of the present invention is to provide a bicycle hub that is relatively inexpensive to manufacture.

The foregoing objects can basically be attained by providing a bicycle disc brake hub comprising a hub axle, a hub shell, a brake rotor attachment portion and a locking ring. The hub axle has a center axis extending in an axial direction between a first axle end and a second axle end. The hub shell has first and second hub shell ends with the hub axle rotatably coupled to the hub shell. The brake rotor attachment portion is disposed at the first hub shell end. The brake rotor attachment portion has an external surface with an external splined section and an annular internal surface with internal threads. The locking ring has a center tubular section with external threads and an abutment flange extending outwardly from the center tubular section to form an axially facing retaining surface. The external threads of the center tubular section mate with the internal threads of the brake rotor attachment portion.

In one embodiment of the present invention, the brake rotor is held between the locking ring and the rotor mounting boss, while in another embodiment of the present invention, the brake rotor is riveted to the rotor mounting boss.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is an exploded elevational view of the front disc brake hub illustrated in FIGS. 4-6, with the upper portion of the front disc brake shown in cross-section;

FIG. 8 is an assembled elevational view of the front disc brake hub illustrated in FIGS. 4-7, with the upper portion of the front disc brake shown in cross-section;

FIG. 19 is a side elevational view of the rear disc brake hub in accordance with present invention, with the upper half of the rear disc brake hub illustrated in cross-section;

FIG. 20 is an elevational view of the rear disc brake hub illustrated in FIG. 18 with the upper half of the rear disc brake hub illustrated in cross-section and with the rear disc brake rotor, the rotor mounting boss and the rotor locking ring removed;

DETAILED DESCRIPTION OF THE PREFERRED EMBODIMENTS

Figure 1:
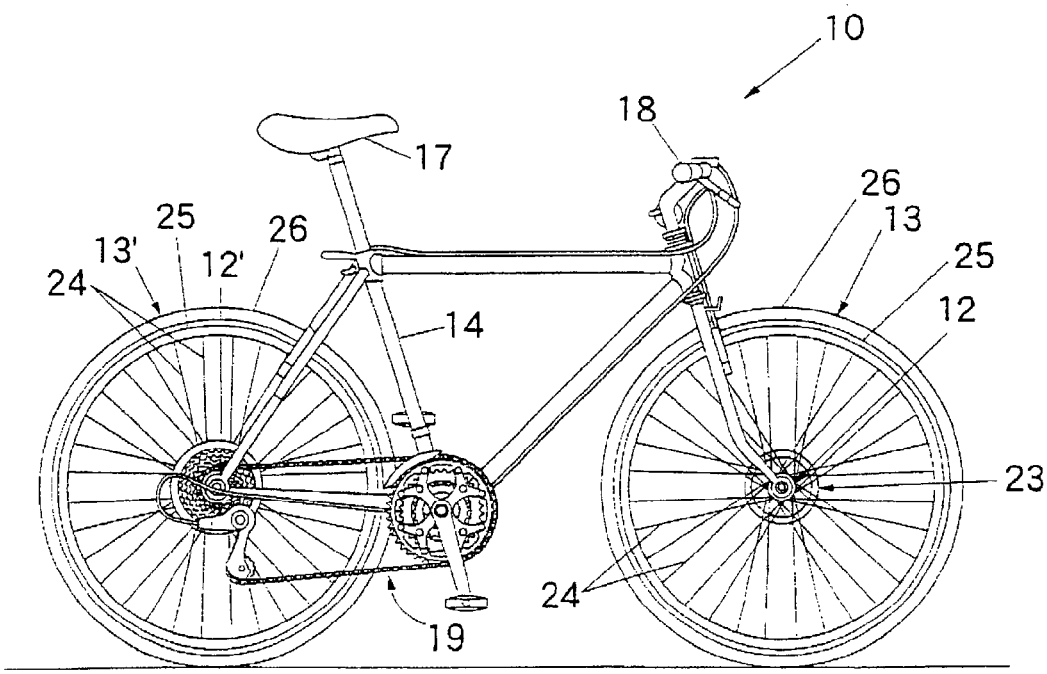
FIG. 1 is a side elevational view of a conventional bicycle with front and rear disc brake hubs in accordance with a first embodiment of the present invention.
Figure 2:
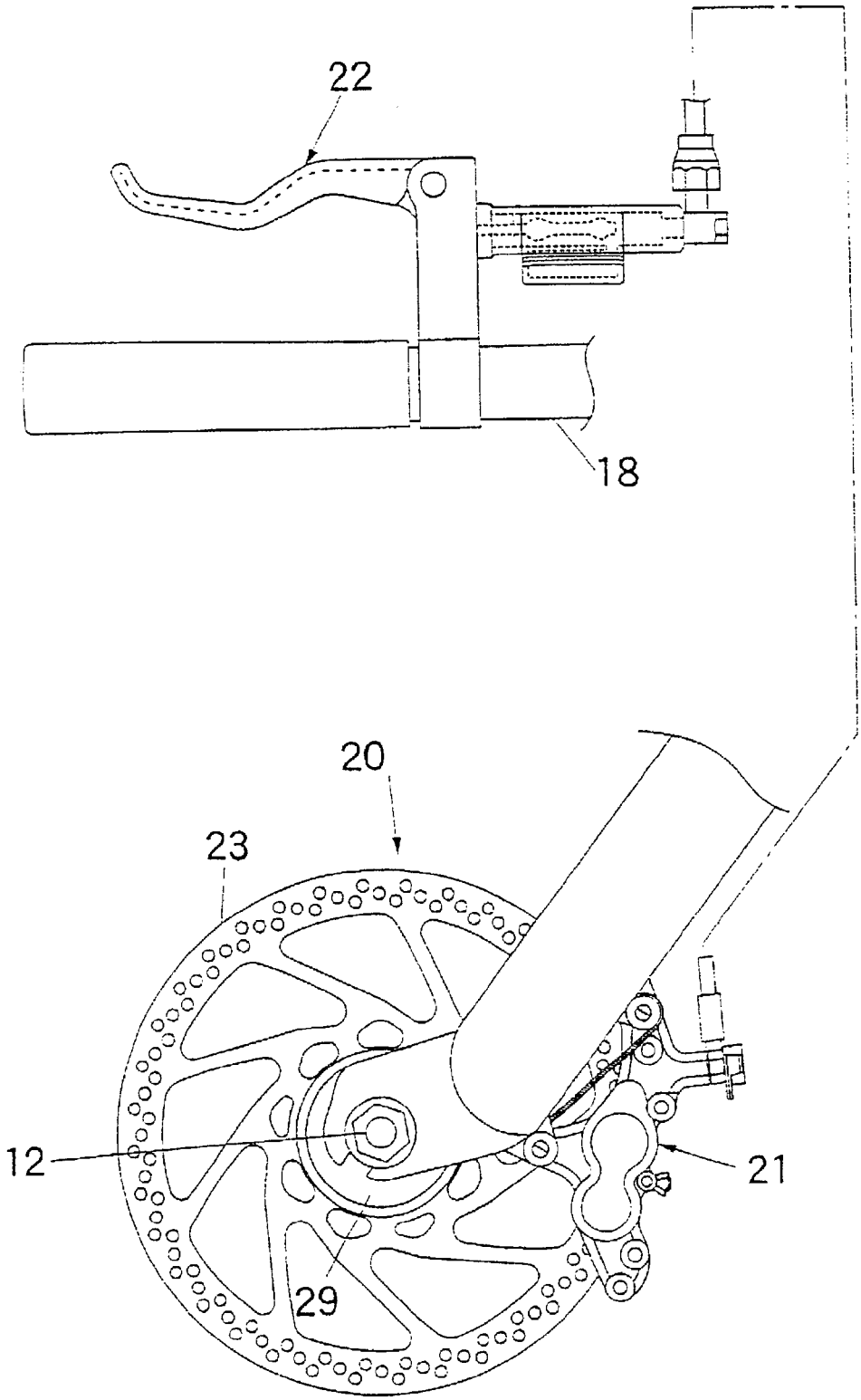
FIG. 2 is a schematic elevational view of the from disc brake assembly coupled to a front fork and a front disc brake operating mechanism of the bicycle illustrated in FIG. 1.
Figure 3:
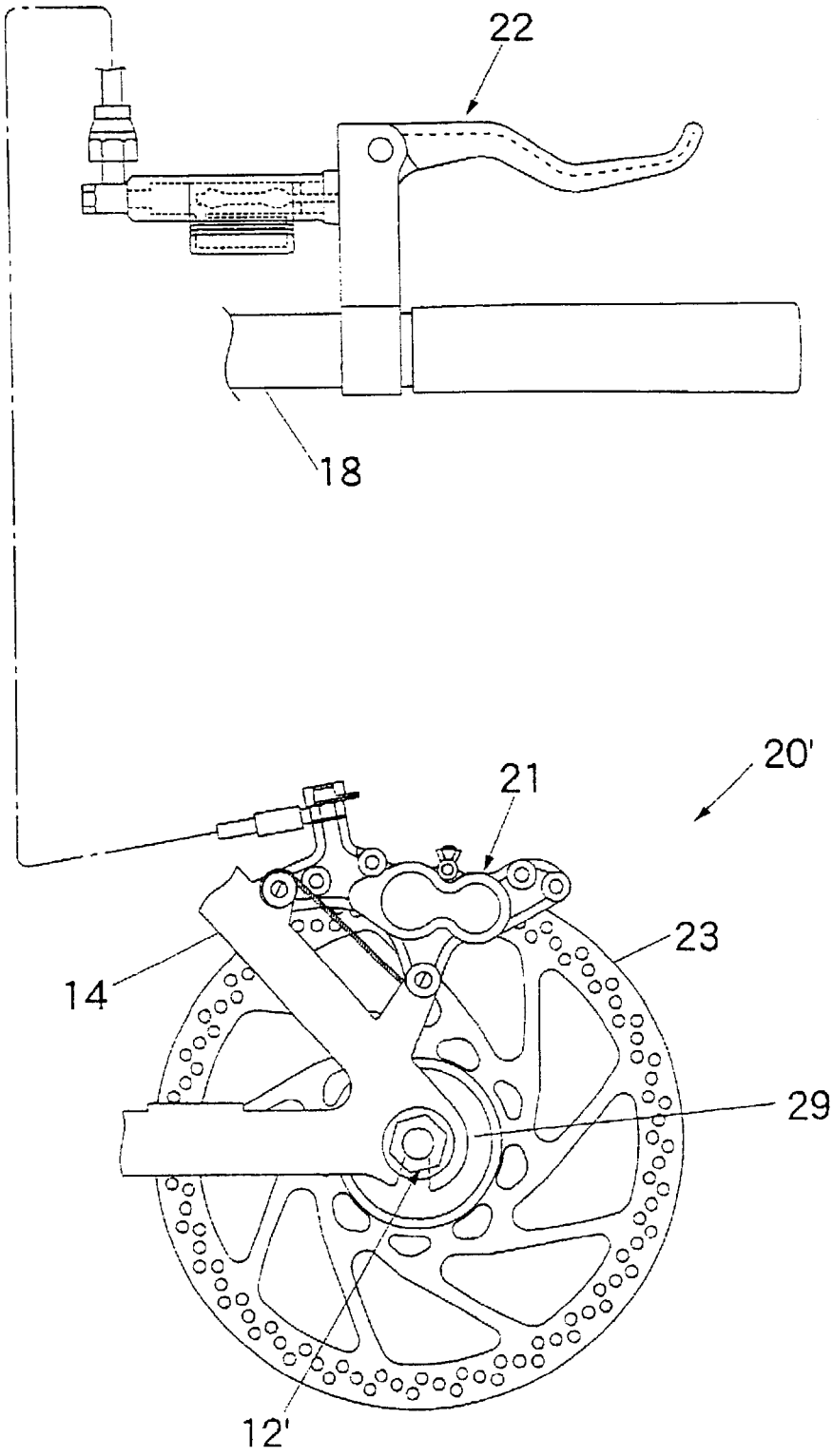
FIG. 3 is a schematic elevational view of the rear disc brake assembly coupled to a rear fork and a rear disc brake operating mechanism of the bicycle illustrated in FIG. 1.
Figure 4:
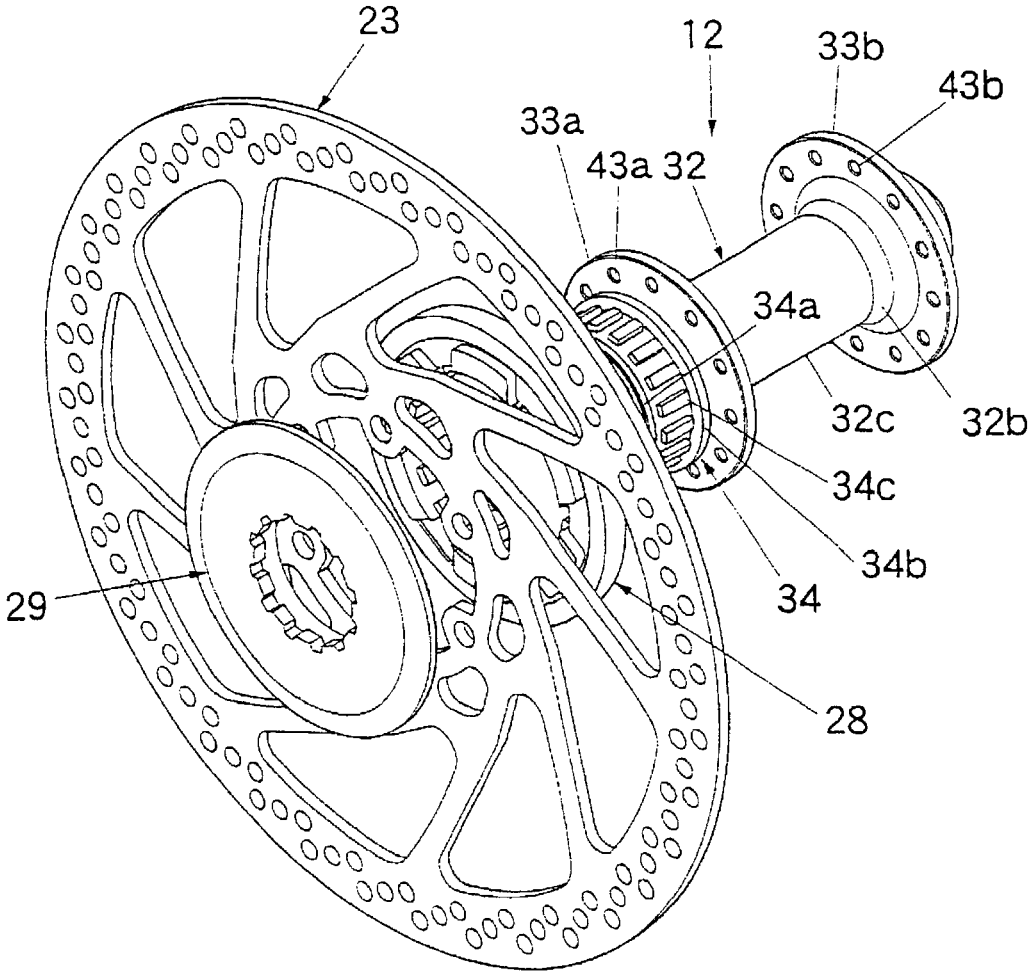
FIG. 4 is an exploded outer side perspective view of the front disc brake hub in accordance with the first embodiment of the present invention.
Figure 5:
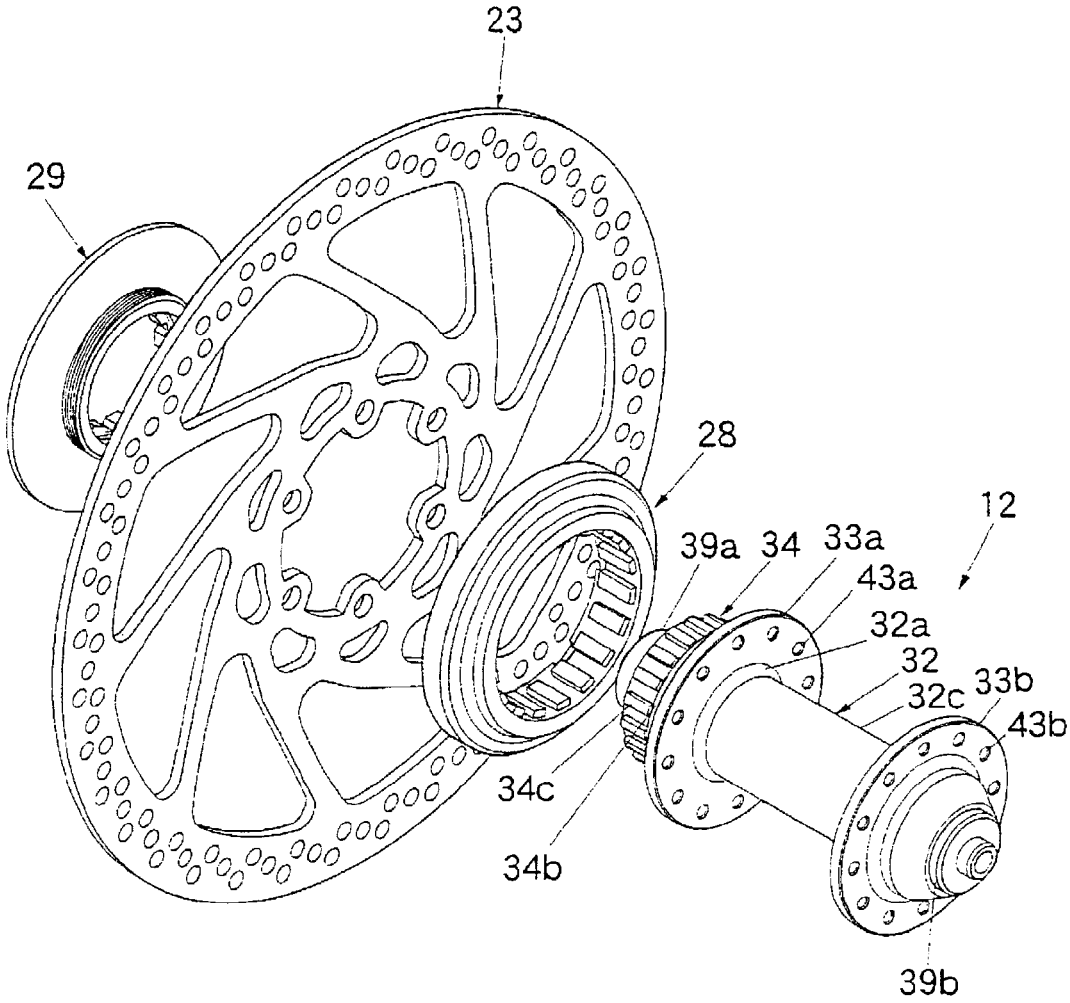
FIG. 5 is an exploded inner side perspective view of the front disc brake hub illustrated in FIG. 4 in accordance with the first embodiment of the present invention.
Figure 6:
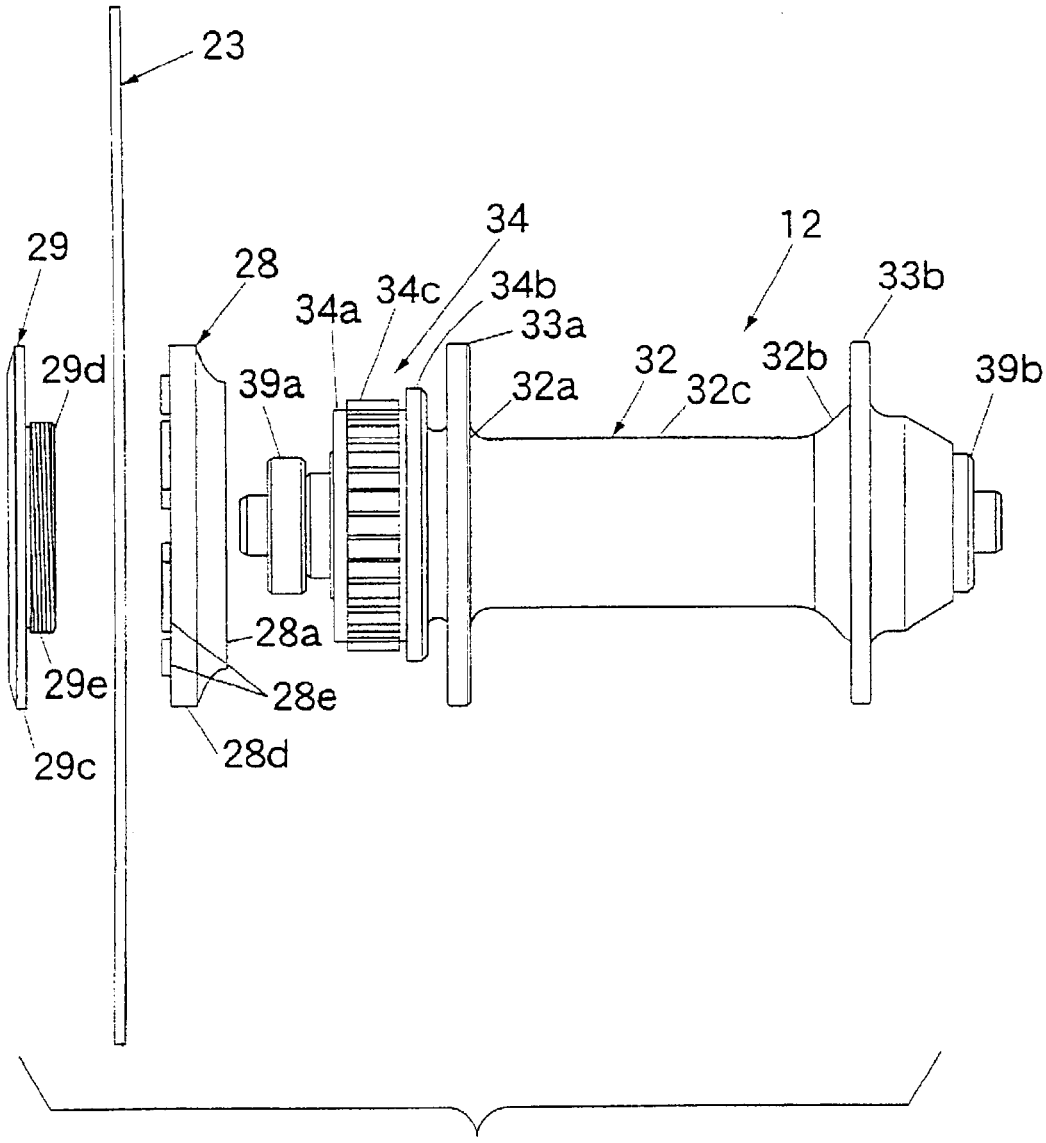
FIG. 6 is an exploded elevational view of the front disc brake hub illustrated in FIGS. 4 and 5 in accordance with the first embodiment of the present invention.
Figure 9:
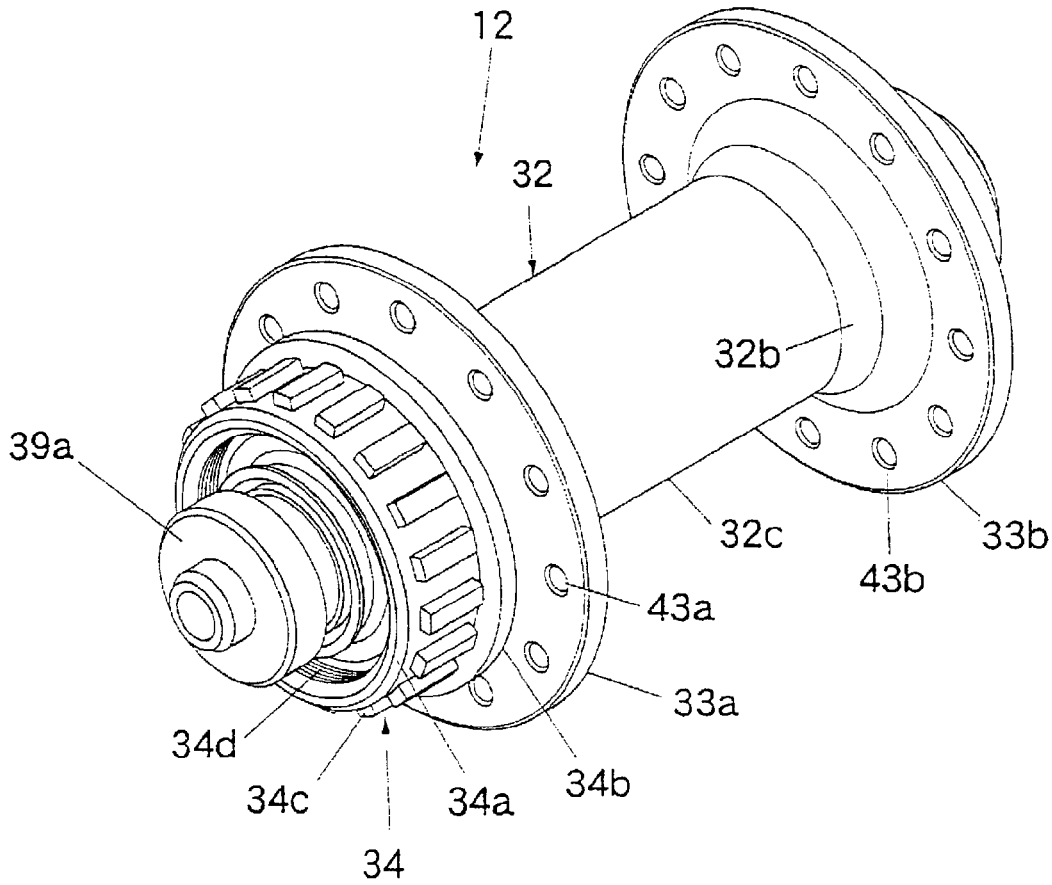
FIG. 9 is an enlarged perspective view of the front disc brake hub illustrated in FIGS. 4-8, with the [rear] *front* disc brake rotor, the rotor mounting boss and the rotor locking ring removed.
Figure 10:
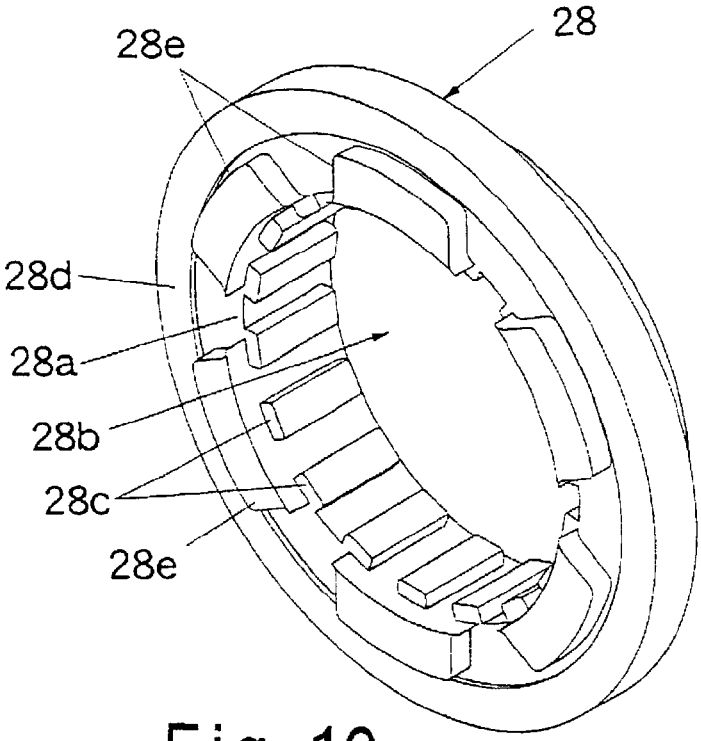
FIG. 10 is an outer side perspective view of the rotor mounting boss for the front disc brake hub illustrated in FIGS. 4-9 in accordance with the first embodiment of the present invention.
Figure 11:
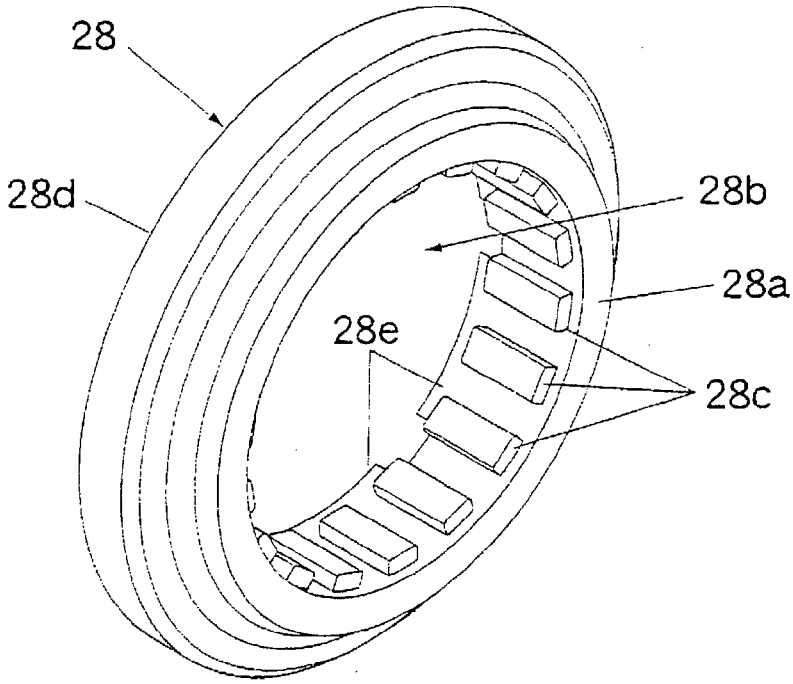
FIG. 11 is an inner side perspective view of the rotor mounting boss illustrated in FIG. 10 for the front disc brake hub illustrated in FIGS. 4-9.
Figure 12:
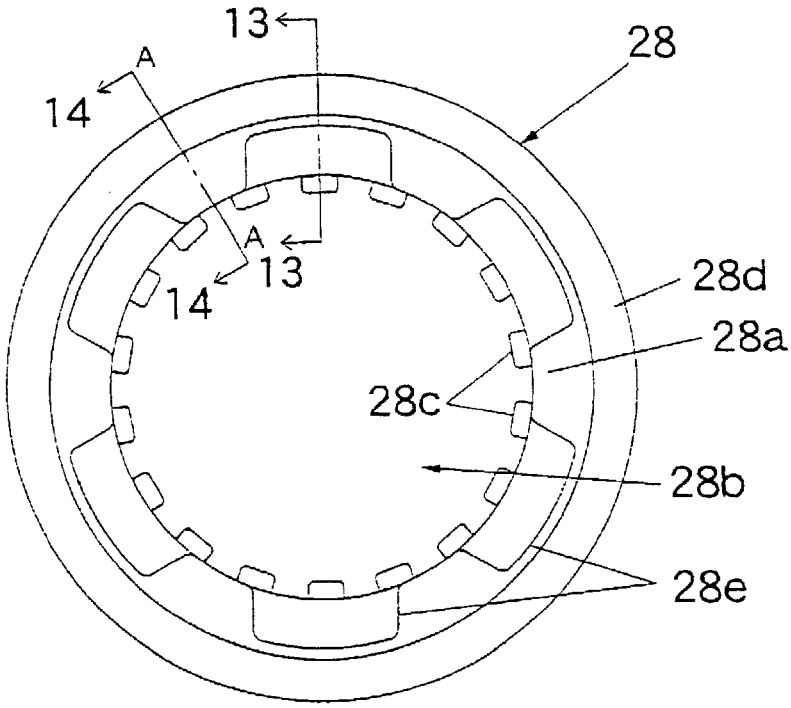
FIG. 12 is an inside elevational view of the rotor mounting boss illustrated in FIGS. 10 and 11 for the front disc brake hub illustrated in FIGS. 4-9.
Figure 13:
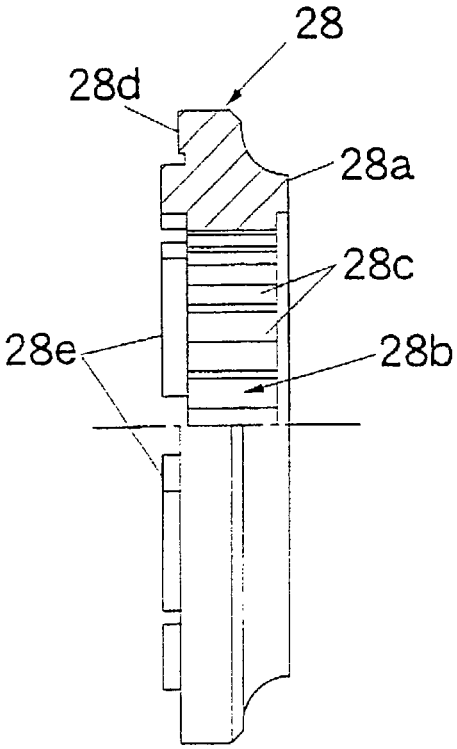
FIG. 13 is a partial cross-sectional view of the rotor mounting boss illustrated in FIGS. 10-12 as seen along section line 13-13 of FIG. 12.
Figure 14:
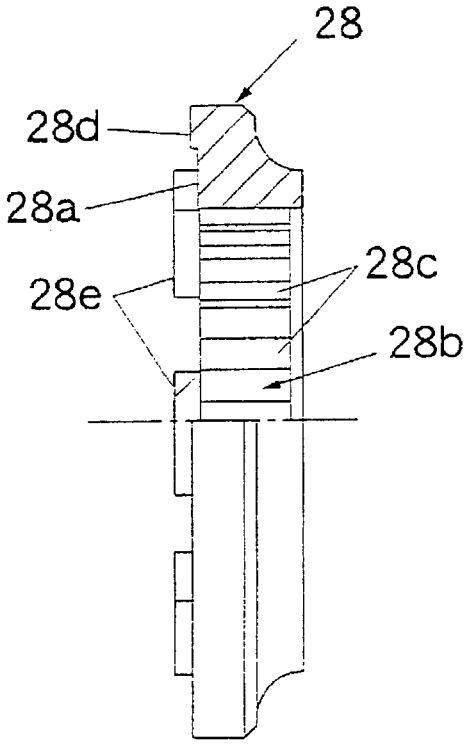
FIG. 14 is a partial cross-sectional view of the rotor mounting boss illustrated in FIGS. 10-13 as seen along section line 14-14 of FIG. 12.
Figure 15:
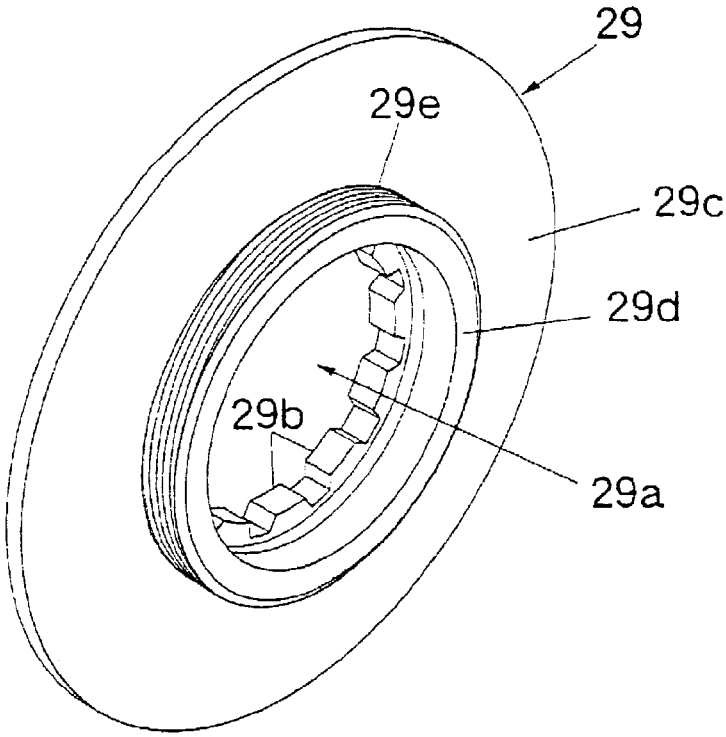
FIG. 15 is an inner side perspective view of the rotor locking ring for the front disc brake hub illustrated in FIGS. 4-9 in accordance with the first embodiment of the present invention.
Figure 16:
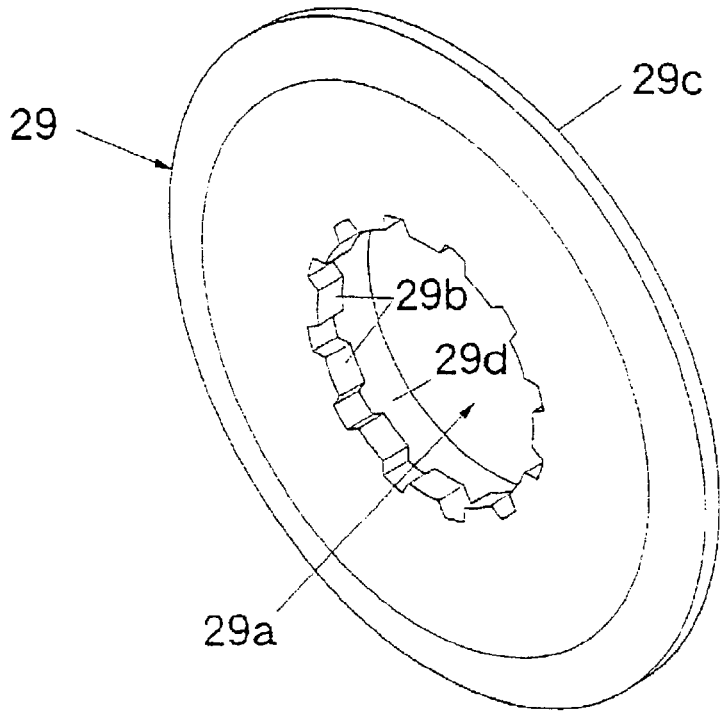
FIG. 16 is an outer side perspective view of the rotor locking ring illustrated in FIG. 15 for the front disc brake hub illustrated in FIGS. 4-9.
Figure 17:
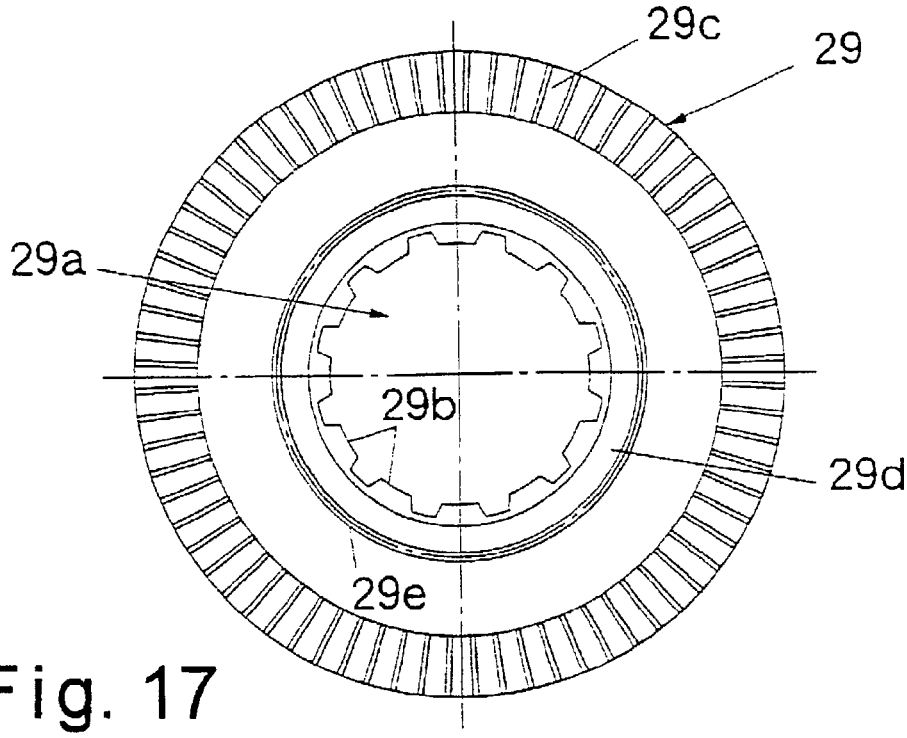
FIG. 17 is an inner side elevational view of the rotor locking ring illustrated in FIGS. 15 and 16 for the front disc brake hub illustrated in FIGS. 4-9.
Figure 18:
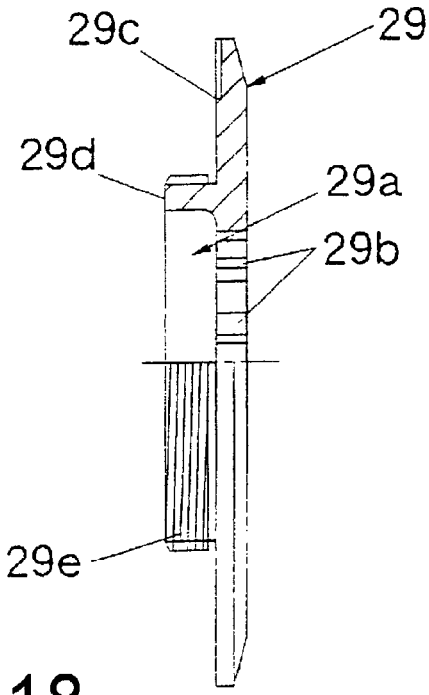
FIG. 18 is a partial cross-sectional view of the rotor locking ring illustrated in FIGS. 15-17 as seen along section line 18-18 of FIG. 17.

Referring initially to FIGS. 1-3, a bicycle 10 is illustrated with front and rear disc brake hubs 12 and 12' in accordance with a first embodiment of the present invention as discussed below. The front disc brake hub 12 rotatably couples a front wheel 13 to a front fork of a frame 14, while the rear disc brake hub 12' rotatably couples a rear wheel 13' to a rear portion of a frame 14 of the bicycle 10. The frame 14 also includes a seat 17 adjustably coupled to the frame 14, a handlebar 18 coupled to the front fork for turning the front wheel 13 and a drive train 19 for propelling the bicycle 10.

Since [these] most of the parts of the bicycle 10 are well known in the art, the parts of the bicycle 10 will not be discussed or illustrated in detail herein, except for the parts relating to the front and rear disc brake hubs 12 and 12' of the present invention. Moreover, various conventional bicycle parts such as brakes, derailleurs, additional sprocket, etc., which are not illustrated and/or discussed in detail herein, can be used in conjunction with the present invention.

As best seen in FIGS. 1-3, the bicycle 10 is also provided with front and rear disc brake assemblies 20 and 20'. The front disc brake assembly 20 and the rear disc brake assembly 20' are basically identical, except for the front and rear disc brake hubs 12 and 12'. In other words, the front disc brake assembly 20 and the rear disc brake assembly 20' uses many of the same parts. The front disc brake assembly 20 and the rear disc brake assembly 20' each includes a caliper 21 operatively coupled to a brake lever 22 and a disc brake rotor 23. In the case of the front disc brake assembly 20, the disc brake rotor 23 is fixedly coupled to the front disc brake hub 12 of the front wheel 13. Similarly, in the case of the rear disc brake assembly 20', the disc brake rotor 23 is fixedly coupled to the rear disc brake hub 12' of the rear wheel 13'.

As seen in FIG. 1, the front and rear disc brake hubs 12 and 12' of the front and rear wheels 13 and 13' have a plurality of spokes 24 extending outwardly therefrom. The outer ends of the spokes 24 are fixedly coupled to the rim 25 by spoke nipples (not shown). A tire 26 is located on the outer surface of each of the rims 25 in a conventional manner.

The disc brake rotors 23 are removably attached to the front and rear disc brake hubs 12 and 12' by rotor mounting bosses 28 and locking rings 29, respectively, as explained below. The rotor mounting bosses 28 cooperate with the front and rear disc brake hubs 12 and 12' to secure disc brake rotors 23 without rivets or bolts.

Front Hub 12

Turning now to FIGS. 4-9, the front disc brake hub 12 is illustrated in accordance with the present invention. The front disc brake hub 12 is basically a conventional hub, except for the structure that secures the disc brake rotor 23 thereto. Thus, conventional parts of the bicycle disc brake hub 12' will not illustrated and/or discussed in detail herein. The front hub 12 is substantially identical to the rear hub 12', except that the front hub 12 does not have a freewheel.

The bicycle disc brake hub 12 basically comprising a hub axle 31, a hub shell 32, a first spoke attachment portion 33a, a second spoke attachment portion 33b, and a brake rotor attachment portion 34. The bicycle disc brake hub 12 is basically a conventional hub, except for the configuration of the brake rotor attachment portion 34. Thus, conventional parts of the bicycle disc brake hub 12 will not illustrated and/or discussed in detail herein.

The hub axle 31 has a center axis O extending in an axial direction between a first axle end 31a and a second axle end 31b. The hub axle 31 has a center bore 31c such that a quick release mechanism (not shown) is coupled to the hub axle 31 in a conventional manner. The hub axle 31 rotatably supports the hub shell 32 by first and second bearing assemblies 36a and 36b. The first and second ends 31a and 31b of the hub axle 31 are threaded for receiving a pair of nuts 39a and 39b that applies an axial force on the hub shell 32 and the bearing assemblies 36a and 36b.

The hub shell 32 is a tubular member that has an interior passageway 40 extending between first and second hub shell ends 32a and 32b with the hub axle 31 being rotatably supported in the interior passageway 40. In particular, the first and second bearing assemblies 36a and 36b rotatably mount the hub shell 32 on the hub axle 31 for freely rotating the hub shell 32 in both directions about the hub axle 31. The hub shell 32 also has a center tubular portion 32c located between the first and second hub shell ends 32a and 32b, which are integral formed with the center tubular portion 32c as a one-piece, unitary member. The first and second spoke attachment portions 33a and 33b and the brake rotor attachment portion 34 are integrally formed with the hub shell 32 as a one-piece, unitary member. In particular, the first hub shell end 32a has the first spoke attachment portion 33a and the brake rotor attachment portion 34 integrally mounted thereon, while the second hub shell end 32b has the second spoke attachment portion 33b integrally mounted thereon.

The bearing assemblies 36a and 36b rotatably support the hub shell 32 on the hub axle 31. Since the bearing assemblies 36a and 36b are well known in the bicycle art, they will not be discussed or illustrated in detail herein. The bearing assembly 36a basically includes a plurality of balls located between an inner race member and an outer race member in a conventional manner. Similarly, the bearing assembly 36b basically includes a plurality of balls located between an inner race member and an outer race member in a conventional manner.

The first spoke attachment portion 33a is preferably an annular spoke flange that is located at the first hub shell end 32a of the hub shell 32. The first spoke attachment portion 33a has a plurality of first spoke holes 43a. In this embodiment, the first spoke holes 43a are equally spaced apart about the imaginary circle. The first spoke holes 43a are arranged to [receiving] *receive* the bent ends of the spokes 24. Similarly, the second hub shell end 32b of the hub shell 32 is provided with a plurality of second spoke holes 43b for receiving the bent ends of the spokes 24. In the illustrated embodiment, the second spoke holes 43b are equally spaced apart about the imaginary circle that is centered on the center axis O of the hub axle 31. Each of the spoke holes 43b is also designed to receive one of the bent ends of the spokes 24. Accordingly, the front hub 12 is designed to have spokes extending outwardly therefrom in a generally tangential direction.

The brake rotor attachment portion 34 is integrally formed with the first hub end 32a of the hub shell 32 as a one-piece, unitary member. The brake rotor attachment portion 34 is disposed at the first hub shell end 32a adjacent the first spoke attachment portion 33a. The brake rotor attachment portion 34 is a tubular member, which has a tubular section 34a and an annular abutment flange 34b extending outwardly from the tubular section 34a in a radial direction. The annular abutment flange 34b is spaced from the free end of tubular section 34a. The tubular section 34a has an external surface with an external splined section 34c and an annular internal surface with internal threads 34d. The external splined section 34c has a plurality of axially extending external splines to non-rotatably engage the rotor mounting boss 28. The internal threads 34d threadedly engage the locking ring 29. Thus, the disc brake rotor 23 is non-rotatably secured to the brake rotor attachment portion 34 between the rotor mounting boss 28 and locking ring 29.

As best seen in FIGS. 10-14, the rotor mounting boss 28 is a ring-shaped member, which has a base section 28a with a center opening 28b with a plurality of internal splines 28c that mate with the external splined section 34c of the brake rotor attachment portion 34. Thus, relative rotation between the rotor mounting boss 28 and the brake rotor attachment portion 34 of the front hub 12 is prevented. The rotor mounting boss 28 also has an outer rotor attachment section 28d extending from the base section 28a. The base section 28a has at least one axially extending protrusion 28e (preferably six axially extending protrusions 28e). The axially extending protrusions 28e engage the disc brake rotor 23 to prevent relative [axial] rotation between the rotor mounting boss 28 and the disc brake rotor 23. The rotor mounting boss 28 is preferably constructed of a first material, while the disc brake rotor 23 is constructed of a second material having a higher specific gravity than the first material of the rotor mounting boss 28. The first material of the rotor mounting boss 28 is preferably aluminum or any other suitable material, while the second material of the disc brake rotor 23 is preferably stainless steel or any other suitable material.

As best seen in FIGS. 15-18, the locking ring 29 is a disk-shaped member, which has a center opening 29a with a plurality of internal splines 29b. More specifically, the locking ring 29 an abutment flange 29c and a center tubular section 29d extending axially from the inner side of the abutment flange 29c. The center tubular section 29d is concentrically arranged relative to the center opening 29a. The center tubular section 29d has external threads 29e that mate with the internal threads 34d of the brake rotor attachment portion 34. The abutment flange 29c extending outwardly from the center tubular section 29d to form an axially facing retaining surface that opposes a corresponding axially facing retaining surface of the annular abutment flange 34b of the brake rotor attachment portion 34. Thus, the locking ring 29 retains the disc brake rotor 23 and the rotor mounting boss 28 on the external splined section of the brake rotor attachment portion 34, when the external threads 29c of the center tubular section 29d are engaged with the internal threads 34d of the brake rotor attachment portion 34.

Rear Hub 12'

As best seen in FIGS. 19 and 20, the bicycle disc brake hub 12' basically comprising a hub axle 31', a hub shell 32', a first spoke attachment portion 33a[40]′, a second spoke attachment portion 33b[40]′, and a brake rotor attachment portion 34'. The bicycle disc brake hub 12' is basically a conventional hub, except for the structure that secures the disc brake rotor 23 thereto. Thus, conventional parts of the bicycle disc brake hub 12' will not illustrated and/or discussed in detail herein. Moreover, the rear hub 12' is substantially identical to the front hub 12, discussed above, except that the rear hub 12 has a freewheel 37'. In other words, the disc brake rotor 23 is secured to brake rotor attachment portion 34' using the rotor mounting boss 28 and the locking ring 29. In view of the similarity between the rear hub 12' and the front hub 12, the description and illustrations of the bicycle disc brake hub 12' will be omitted for the sake of brevity.

The hub axle 31' has a center axis O' extending in an axial direction between a first axle end 31a[40]′ and a second axle end 31b'. The hub axle 31' has a center bore 31c' such that a quick release mechanism (not shown) is coupled to the hub axle 31' in a conventional manner. The hub axle 31' rotatably supports the hub shell 32' by first and second bearing assemblies 36a[40]′ and 36b'. The second axle end 31b' has the freewheel 37' operatively coupled between the hub axle 31' and the hub shell 32' in a conventional manner. The hub shell 32' is fixed with respect to the hub axle 31' in one rotational direction by the freewheel 37', while the freewheel 37' allows the hub shell 32' to freely rotate with respect to the hub axle 31' in the opposite rotational direction. The first and second ends 31a' and 31b' of the hub axle 31' are threaded for receiving a pair of nuts 39a' and 39b' that applies an axial force on the hub shell 32', the bearing assemblies 36a[40]′ and 36b' and the freewheel 37'.

The hub shell 32' is a tubular member that has an interior passageway 40' extending between first and second hub shell ends 32a' and 32b' with the hub axle 31' being rotatably supported in the interior passageway 40'. In particular, the first and second bearing assemblies 36a[40]′ and 36b' rotatably mount the hub shell 32' within the interior passageway 40'. The hub shell 32' also has a center tubular portion 32c' located between the first and second hub shell ends 32a' and 32b', which are integral formed with the center tubular portion 32c' as a one-piece, unitary member. The first and second spoke attachment portions 33a' and 33b' and the brake rotor attachment portion 34' are integrally formed with the hub shell 32' as a one-piece, unitary member. In particular, the first hub shell end 32a' has the first spoke attachment portion 33a' and the brake rotor attachment portion 34' integrally mounted thereon, while the second hub shell end 32b' has the second spoke attachment portion 33b' integrally mounted thereon.

The second hub shell end 32b' has the freewheel 37' fixedly coupled thereto. The freewheel 37' is attached between the second hub shell end 32b' and the second axle end 31b' to allow the hub axle 31' to rotate freely relative to the hub shell 32' in one direction, but fixedly couples the hub axle 31' relative to the hub shell 32' in the opposite rotational direction.

The bearing assemblies 36a[40]'and 36b' rotatably support the hub shell 32' on the hub axle 31'. Since the bearing assemblies 36a[40]' and 36b' are well known in the bicycle art, they will not be discussed or illustrated in detail herein. The bearing assembly 36a[40]' basically includes a plurality of balls located between an inner race member and an outer race member in a conventional manner. Similarly, the bearing assembly 36b' basically includes a plurality of balls located between an inner race member and an outer race member in a conventional manner.

Bicycle freewheels, such as the freewheel 37', are well known in the bicycle art, and thus, the freewheel 37' will not be illustrated or discussed in detail herein. The freewheel 37' is used to transmit a driving force from the chain to the rear bicycle wheel in one rotation direction only. The freewheel 37' allows the bicycle 10 to advance freely without any rotation of the pedals. The freewheel 37' is fastened to the rear hub 12' as integral part of the rear hub 12' in a conventional manner. The freewheel 37' basically includes an outer tubular part 37a', an inner tubular part 37b' and a one-way clutch 37c'. The inner tubular part 37b', is installed radially inwardly of the outer tubular part 37a' so that the inner tubular part 37b' is free to rotate relative to the outer tubular part 37a'. The one-way clutch 37c' is installed between the outer tubular part 37a' and inner tubular part 37b' for transmitting the driving force from the outer tubular part 37a' to the inner tubular part 37b' in one rotational direction only. The outer tubular part 37a' has a plurality of gears or sprockets (not shown) mounted thereon, while the inner tubular part 37b' is fixedly mounted on the hub axle 31'.

The first spoke attachment portion 33a' is preferably an annular spoke flange located at the first hub shell end 32a' of the hub shell 32'. The first spoke attachment portion 33a' has a plurality of first spoke holes 43a' equally spaced apart about an imaginary circle that is centered about the center axis O'. The first spoke holes 43a' are arranged to [receiving] *receive* the bent ends of the spokes 24. Similarly, the second hub shell end 32b' of the hub shell 32' is provided with a plurality of second spoke holes 43b' equally spaced apart about the imaginary circle that is centered on the center axis O' of the hub axle 31'. Each of the spoke holes 43b' is also designed to receive one of the bent ends of the spokes 24.

The brake rotor attachment portion 34' is integrally formed with the first hub end 32a' of the hub shell 32' as a one-piece, unitary member. The brake rotor attachment portion 34' is disposed at the first hub shell end 38a' adjacent the first spoke attachment portion 33a'. The brake rotor attachment portion 34' is a tubular member, which has a tubular section 34a' and an annular abutment flange 34b' extending outwardly from the tubular section 34a' in a radial direction. The annular abutment flange 34b' is spaced from the free end of tubular section 34a'. The tubular section 34a' has an external surface with an external splined-section 34c' and an annular internal surface with internal threads 34d'. The external splined section 34c' has a plurality of axially extending external splines to non-rotatably engage the internal splines 28c of the rotor mounting boss 28. The internal threads 34d' threadedly engage the external threads 29c of the locking ring 29. Thus, the disc brake rotor 23 is non-rotatably secured to the brake rotor attachment portion 34' between the rotor mounting boss 28 and the locking ring 29.

Bicycle Disc Brake Rotor

Figure 21:
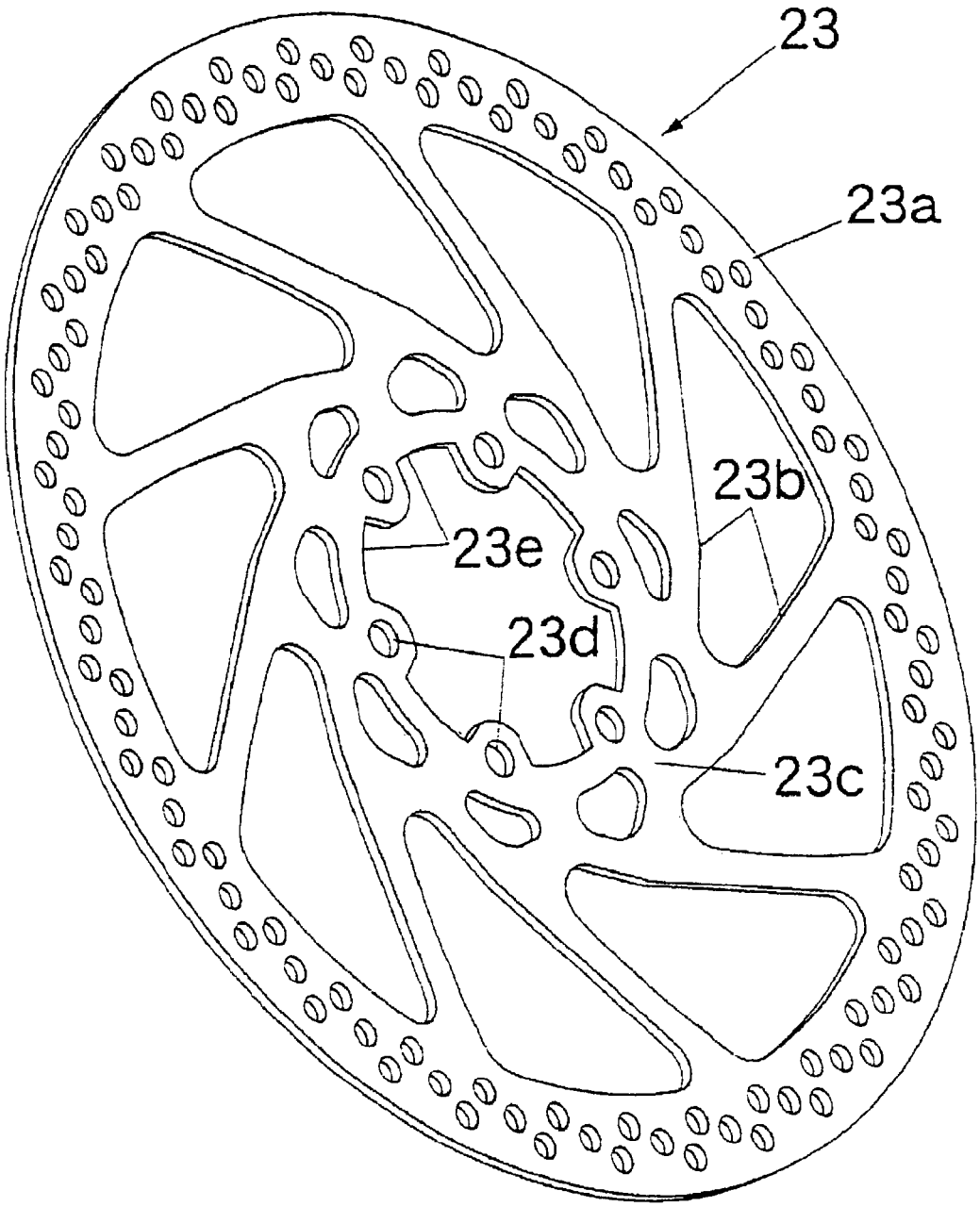
FIG. 21 is a perspective view of one of the disc brake rotors utilized with the front and rear disc brake hubs.
Figure 22:
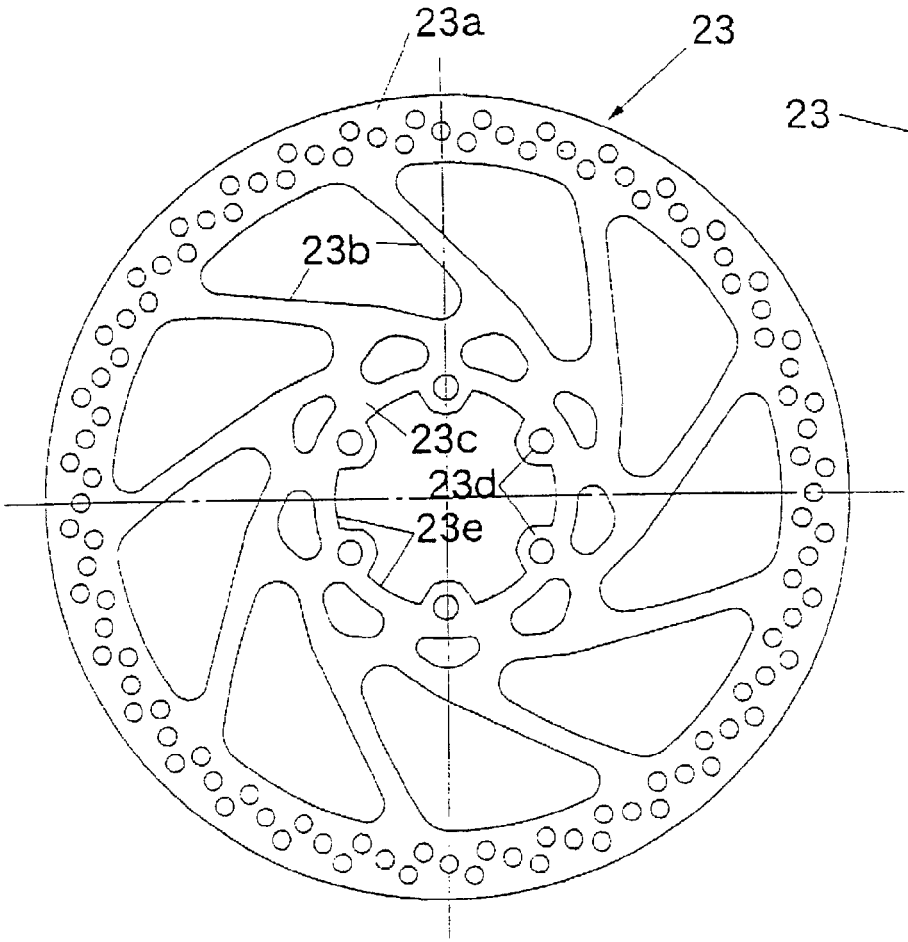
FIG. 22 is a side elevational view of the disc brake rotor illustrated in FIG. 21.
Figure 23:
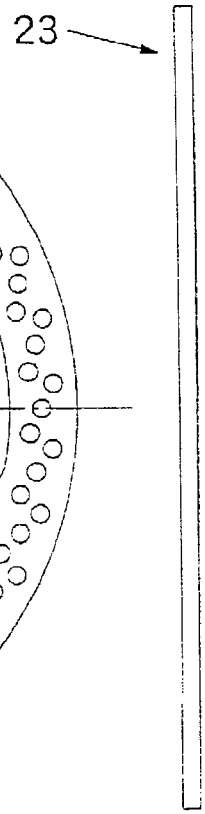
FIG. 23 is an edge elevational view of the disc brake rotor illustrated in FIGS. 20 and 21.

Referring now to FIGS. 21-23, the disc brake rotor 23 basically includes an annular braking ring 23a, a plurality (nine) of outwardly extending connecting arms 23b integrally formed with annular braking ring 23a, and an inner mounting portion 23c integrally formed with the connecting arms 23b. Accordingly, the bicycle brake rotor 23 is a one-piece, unitary member. Preferably, the bicycle brake rotor 23 is constructed of any suitable rigid material.

The annular braking ring 23a is preferably vented with a plurality of holes. The annular braking ring 23a forms an outer braking portion of the disc brake rotor 23. The outer ends of the connecting arms 23b are equally spaced about the inner edge of the annular braking ring 23a.

The connecting arms 23b form an intermediate connecting portion of the bicycle brake rotor 23 extending between the annular braking ring 23a and the inner mounting portion 23c. These connecting arms 23b extend tangentially from the inner mounting portion 23c. The connecting arms 23b have triangular openings located therebetween.

The inner mounting portion 23c has a plurality (six) of axially extending attachment holes 23d and a plurality (six) of attachment notches 23e. The attachment holes 23d and the attachment notches 23e are equally spaced about the circumference of the inner mounting portion 23c. The attachment notches 23e are arranged to mate with the axially extending protrusions 28e to prevent relative axial rotation between the rotor mounting boss 28 and the disc brake rotor 23. The attachment holes 23d are normally used when the disc brake rotor 23 is fastened to a hub by bolts. Of course, the axially extending protrusions 28e of the rotor mounting boss 28 can be configured to engage the attachment holes 23d instead of the attachment notches 23e. Preferably, the axially extending protrusions 28e have an axial length that is no greater than an axially thickness of the inner mounting portion 23c of the disc brake rotor 23.

Second Embodiment

Figure 24:
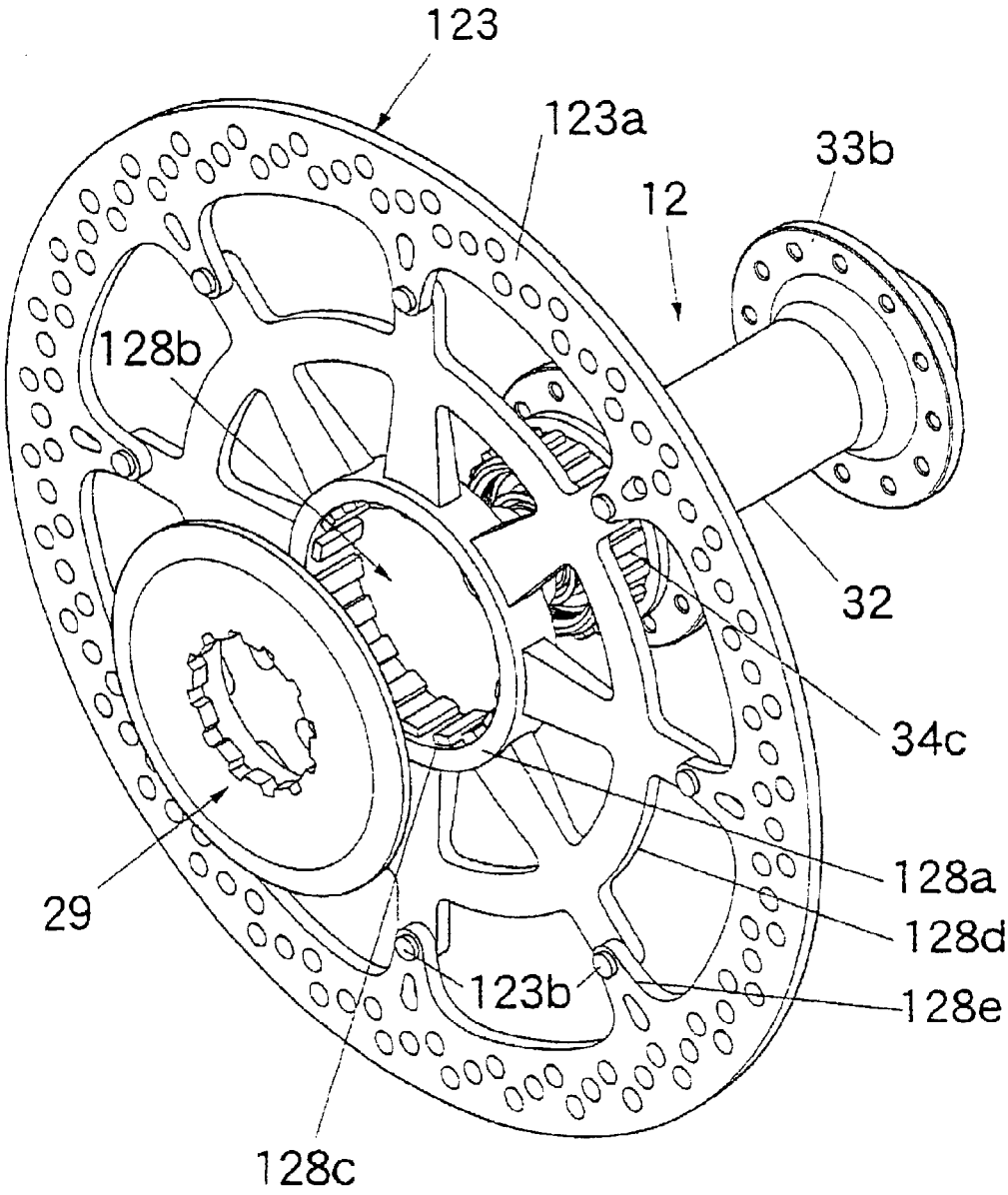
FIG. 24 is an outer side perspective view of a front disc brake hub in accordance with a second embodiment of the present invention.
Figure 25:
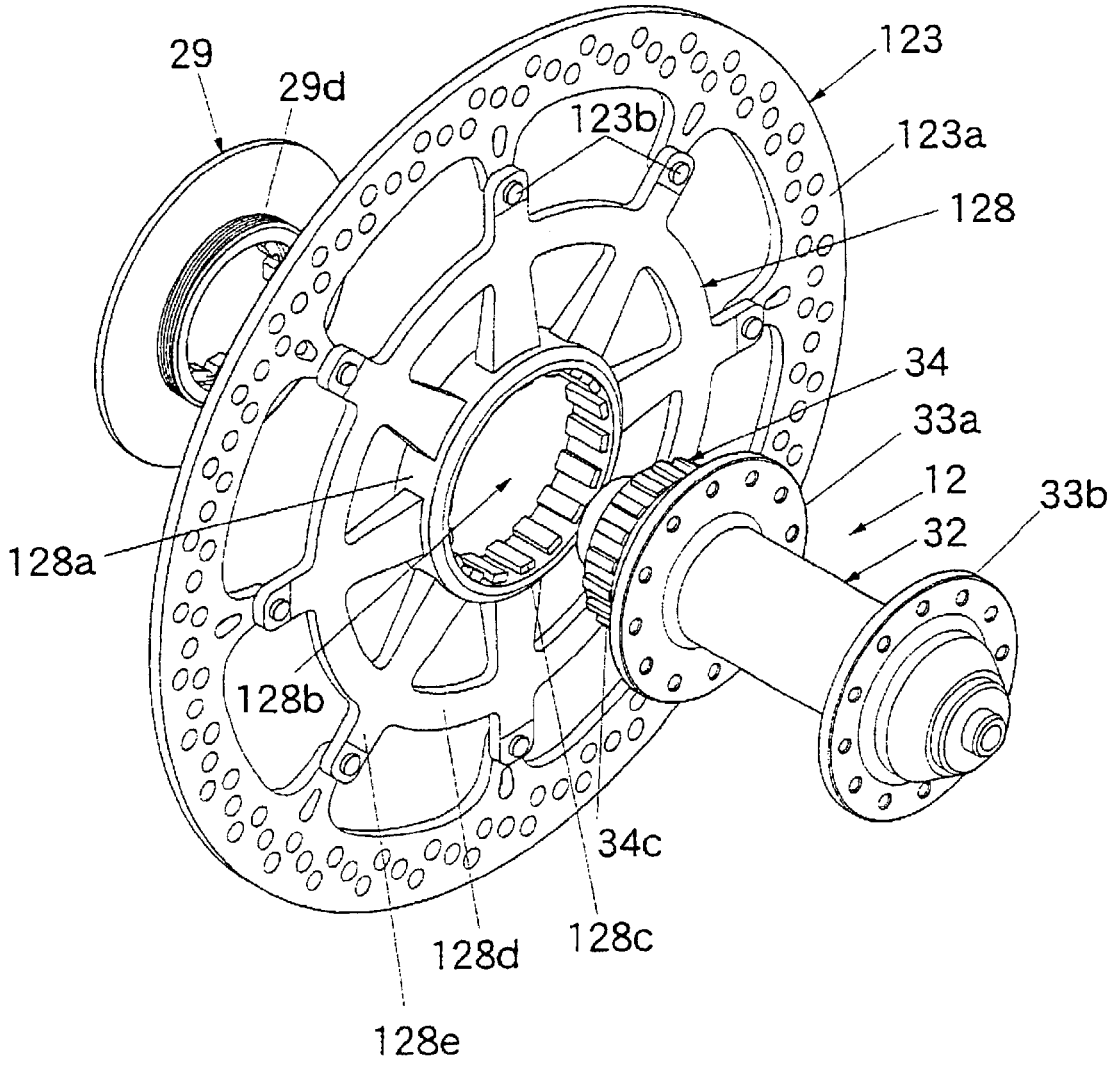
FIG. 25 is an inner side elevational view of a front disc brake hub illustrated in FIG. 23 in accordance with a second embodiment of the present invention.

Referring now to FIGS. 24 and 25, an alternate disc brake rotor 123 is illustrated in accordance with second embodiment of the present invention. While the disc brake rotor 123 is illustrated with the front hub 12, the alternate disc brake rotor 123 is designed to be used with either the front hub 12 or the rear hub 12'.

The alternate disc brake rotor 123 is basically the rotor mounting boss 28 of the first embodiment being formed as part of the disc brake rotor 23. In other words, the disc brake rotor 123 basically includes an annular braking ring 123a and a rotor mounting boss 128 coupled to the annular braking ring 123a via eight rivets 123b. The annular braking ring 123a is preferably vented with a plurality of holes. The annular braking ring 123a forms an outer braking portion of the disc brake rotor 123.

The rotor mounting boss 128 has a base section 128a with central opening 128b with a plurality of internal splines 128c that mate with the external splined section 34c of the brake rotor attachment portion 34. Thus, relative rotation between the rotor mounting boss 128 and the brake rotor attachment portion 34 of the front hub 12 is prevented. The rotor mounting boss 128 also has an outer rotor attachment section 128d extending from the base section with eight attachment points 128e. The rotor mounting boss 128 is preferably constructed of a first material while the annular braking ring 128 is constructed of a second material having a higher specific gravity than the first material of the rotor mounting boss 128. The first material of the rotor mounting boss 128 is preferably aluminum or any other suitable material, while the second material of the annular braking ring 123a is preferably stainless steel or any other suitable material.

Similar to the first embodiment, the rotor mounting boss 128 with the annular braking ring 128a riveted thereto is removably secured to the brake rotor attachment portion 34 of the front hub 12 by the locking ring 29. More specifically, the external threads 29c of the locking ring 29 threadedly engage the internal threads 34d of the front hub 12 such that the rotor mounting boss 128 is sandwiched between the abutment flanges 29c and 34b. Thus, the locking ring 29 retains the disc brake rotor 123 on the external spline section of the brake rotor attachment portion 34.

As mentioned above, the disc brake rotor 123 can also be mounted on the rear hub 12' utilizing the locking ring 29 in the same manner as the disc brake rotor 23 is mounted on the front hub 12.

As used herein, the. following directional terms "forward, rearward, above, downward, vertical, horizontal, below and transverse" as well as any other similar directional terms refer to those directions relative to a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

[1. A bicycle disc brake hub comprising:

a hub axle having a center axis extending in an axial direction between a first axle end and a second axle end;

a hub shell having first and second hub shell ends with said hub axle rotatably coupled to said hub shell;

a brake rotor attachment portion disposed at said first hub shell end, said brake rotor attachment portion having an external surface with an external splined section and an annular internal surface with internal threads; and a locking ring having a center tubular section with external threads and an abutment flange extending outwardly from said center tubular section to form an axially facing retaining surface, said external threads of said center tubular section mating with said internal threads of said brake rotor attachment portion.]

2. [The] *A* bicycle disc brake hub [according to claim 1, further] comprising*:*

*a hub axle having a center axis extending in an axial direction between a first axle end and a second axle end;*

*a hub shell having first and second hub shell ends with said hub axle rotatably coupled to said hub shell;*

*a brake rotor attachment portion disposed at said first hub shell end, said brake rotor attachment portion having an external surface and an annular internal surface with internal threads;*

*a locking ring having an opening therein to form an inner peripheral surface, a center tubular section with external threads and an abutment flange extending outwardly from said center tubular section to form an axially facing retaining surface, said inner peripheral surface having a plurality of splines extending radially inwardly therefrom, said external threads of said center tubular section mating with said internal threads of said brake rotor attachment portion; and* a rotor mounting boss *configured to be non-rotatably mounted to said brake rotor attachment portion, said rotor mounting boss* having [internal splines that mate with said external splined section of said brake rotor attachment portion] *a brake disc fixing structure to non-rotatably engage a brake disc without bolts*, said locking ring retaining said rotor mounting boss on said [external splined section of said brake rotor attachment portion,] *hub* when said external threads of said center tubular section are engaged with said internal threads of said brake rotor attachment portion.

3. [The] *A* bicycle disc brake hub [according to claim 2, wherein] *comprising:*

*a hub axle having a center axis extending in an axial direction between a first axle end and a second axle end;*

*a hub shell having first and second hub shell ends with said hub axle rotatably coupled to said hub shell;*

*a brake rotor attachment portion disposed at said first hub shell end, said brake rotor attachment portion having an external surface with an external splined section and an annular internal surface with internal threads;*

*a locking ring having a center tubular section with external threads and an abutment flange extending outwardly from said center tubular section to form an axially facing retaining surface, said external threads of said center tubular section mating with said internal threads of said brake rotor attachment portion; and*

[said] *a* rotor mounting boss [has] *having* at least one axially extending protrusion *non-movably fixed thereto and internal splines that mate with said external splined section of said brake rotor attachment portion,*

*said locking ring retaining said rotor mounting boss on said external splined section of said brake rotor attachment portion when said external threads of said center tubular section are engaged with said internal threads of said brake rotor attachment portion.*

4. The bicycle disc brake hub according to claim 3, further comprising a brake rotor having an inner mounting portion with at least one notch that mates with said at least one axially extending protrusion to prevent relative [axial] rotation between said rotor mounting boss and said brake rotor.

5. The bicycle disc brake hub according to claim 4, wherein said at least one notch extends axially through said brake rotor and said at least one axially extending protrusion has an axial length that is no greater than an [axially] *axial* thickness of said inner mounting portion of said brake rotor.

6. The bicycle disc brake hub according to claim 4, wherein said at least one axially extending protrusion includes a plurality of axially extending protrusions, and said at least one notch includes a plurality of notches [that] that mate with said protrusions to prevent relative [axial] rotation between said rotor mounting boss and said brake rotor.

7. The bicycle disc brake hub according to claim 6, wherein said notches extend axially through said brake rotor and said protrusions have axial lengths that are no greater than an [axially] *axial* thickness of said inner mounting portion of said brake rotor.

8. The bicycle disc brake hub according to claim 4, wherein said rotor mounting boss is constructed of a first material and said brake rotor is constructed of a second material having a higher specific gravity than said first material.

9. The bicycle disc brake hub according to claim [4] *8*, wherein said first material of said rotor mounting boss is aluminum and said second material of said brake rotor is stainless steel.

10. The bicycle disc brake hub according to claim 9, wherein said first axle end and said first hub shell end are rotatably coupled together by a bearing assembly, and said second axle end and said second hub shell end are coupled together by a freewheel.

11. The bicycle disc brake hub according to claim 4, wherein said first axle end and said first hub shell end are rotatably coupled together by a first bearing assembly to rotate freely in both directions about said center axis of said hub axle, and said second axle end and said second hub shell end are rotatably coupled together by a second bearing assembly to rotate freely in both directions about said center axis of said hub axle.

12. The bicycle disc brake hub according to claim 4, wherein said first hub shell end has a first annular spoke flange with first spoke holes formed therein, and said second hub shell end has a second annular spoke flange with second spoke holes formed therein.

13. The bicycle disc brake hub according to claim 12, wherein said first and second spoke flanges are integrally formed with said hub shell as a one-piece, unitary member.

14. The bicycle disc brake hub according to claim 4, wherein said brake rotor further includes a plurality of intermediate connecting portions integrally formed with said inner mounting portion, and an outer braking portion integrally formed with said intermediate connecting portions.

15. [The] *A* bicycle disc brake hub [according to claim 2, wherein] *comprising:*

*a hub axle having a center axis extending in an axial direction between a first axle end and a second axle end;*

*a hub shell having first and second hub shell ends with said hub axle rotatably coupled to said hub shell;*

*a brake rotor attachment portion disposed at said first hub shell end, said brake rotor attachment portion having an external surface with an external splined section and an annular internal surface with internal threads;*

*a locking ring having an opening therein to form an inner peripheral surface, a center tubular section with external threads and an abutment flange extending outwardly from said center tubular section to form an axially facing retaining surface, said inner peripheral surface having a plurality of splines extending radially inwardly therefrom, said external threads of said center tubular section mating with said internal threads of said brake rotor attachment portion; and*

*a rotor mounting boss having internal splines that mate with said external splined section of said brake rotor attachment portion, said locking ring retaining said rotor mounting boss on said external splined section of said brake rotor attachment portion when said external threads of said center tubular section are engaged with said internal threads of said brake rotor attachment portion,* said rotor mounting boss [has] *having* a base section with said internal splines formed thereon and an outer rotor attachment section extending from said base section.

16. The bicycle disc brake hub according to claim 15, further comprising a brake rotor fixedly coupled to said outer rotor attachment section of said rotor mounting boss.

17. The bicycle disc brake hub according to claim 16, wherein said outer rotor attachment section of said rotor mounting boss is fixedly coupled to said brake rotor by a plurality of fasteners.

18. The bicycle disc brake hub according to claim 17, wherein said fasteners are axially extending rivets.

19. The bicycle disc brake hub according to claim 15, wherein said rotor mounting boss is constructed of a first material and said brake rotor is constructed of a second material having a higher specific gravity than said first material.

20. The bicycle disc brake hub according to claim 19, wherein said first material of said rotor mounting boss is aluminum and said second material of said brake rotor is stainless steel.

21. The bicycle disc brake hub according to claim 15, wherein said first axle end and said first hub shell end are rotatably coupled together by a bearing assembly, and said second axle end and said second hub shell end are coupled together by a freewheel.

22. The bicycle disc brake hub according to claim 15, wherein said first axle end and said first hub shell end are rotatably coupled together by a first bearing assembly to rotate freely in both directions about said center axis of said hub axle, and said second axle end and said second hub shell end are rotatably coupled together by a second bearing assembly to rotate freely in both directions about said center axis of said hub axle.

23. The bicycle disc brake hub according to claim 15, wherein said first hub shell end has a first annular spoke flange with first spoke holes formed therein, and said second hub shell end has a second annular spoke flange with second spoke holes formed therein.

24. The bicycle disc brake hub according to claim 23, wherein said first and second spoke flanges are integrally formed with said hub shell as a one-piece, unitary member.

*25. The bicycle disc brake hub according to claim 2, wherein*

*said first axle end and said first hub shell end are rotatably coupled together by a bearing assembly, and*

*said second axle end and said second hub shell end are coupled together by a freewheel.*

*26. The bicycle disc brake hub according to claim 2, wherein*

*said first axle end and said first hub shell end are rotatably coupled together by a first bearing assembly to rotate freely in both directions about said center axis of said hub axle, and*

*said second axle end and said second hub shell end are rotatably coupled together by a second bearing assembly to rotate freely in both directions about said center axis of said hub axle.*

*27. The bicycle disc brake hub according to claim 2, wherein*

*said first hub shell end has a first annular spoke flange with first spoke holes formed therein, and*

*said second hub shell end has a second annular spoke flange with second spoke holes formed therein.*

*28. The bicycle disc brake hub according to claim 2, further comprising*

*a nut disposed at said first axle end of said a hub axle, said nut having a maximum outer width and said inner peripheral surface of said locking ring having a minimum inner width that is greater than said maximum outer width of said nut.*

*29. The bicycle disc brake hub according to claim 2, wherein*

*said brake disc fixing structure of said rotor mounting boss has at least one axially extending protrusion.*

*30. The bicycle disc brake hub according to claim 29, further comprising*

*a brake rotor having an inner mounting portion with at least one notch that mates with said at least one axially extending protrusion to prevent relative rotation between said rotor mounting boss and said brake rotor.*

*31. A bicycle disc brake hub comprising:*

*a hub axle having a center axis extending in an axial direction between a first axle end and a second axle end;*

*a nut disposed at said first axle end of said hub axle;*

*a hub shell having first and second hub shell ends with said hub axle rotatably coupled to said hub shell;*

*a brake rotor attachment portion disposed at said first hub shell end, said brake rotor attachment portion having an external surface and an annular internal surface with internal threads; and*

*a locking ring having a center opening with a non-circular inner peripheral surface, a center tubular section with external threads and an abutment flange extending outwardly from said center tubular section to form an axially facing retaining surface; and*

*a rotor mounting boss configured to be non-rotatably mounted to said brake rotor attachment portion, said rotor mounting boss having a brake disc fixing structure to non-rotatably engage a brake disc without bolts, said locking ring retaining said rotor mounting boss on said hub when said external threads of said center tubular section are engaged with said internal threads of said brake rotor attachment portion,*

*said external threads of said center tubular section mating with said internal threads of said brake rotor attachment portion, said opening of said locking ring being arranged and configured such that said locking ring can be installed in said axial direction onto said brake rotor attachment portion when said nut is attached to said hub axle.*

*32. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member, and*

*a locking ring having an opening with an inner peripheral surface, a center tubular section with second threads and an abutment flange extending outwardly from said center tubular section to form an axially facing retaining surface,*

*said annular surface being an inner annular surface, said first threads being internal threads and said second threads being external threads.*

*33. The bicycle disc brake hub according to claim 32, wherein*

*said at least one axially extending protrusion of said rotor mounting member includes six axially extending protrusions configured to engage the disc brake rotor.*

*34. The bicycle disc brake hub according to claim 33, wherein*

*said inner peripheral surface of said locking ring has a plurality of projections extending radially inwardly therefrom.*

*35. The bicycle disc brake hub according to claim 34, wherein*

*said first hub shell end has a first annular spoke flange with first spoke holes formed therein, and*

*said second hub shell end has a second annular spoke flange with second spoke holes formed therein.*

*36. The bicycle disc brake hub according to claim 35, wherein*

*said first axle end and said first hub shell end are rotatably coupled together by a bearing assembly, and*

*said second axle end and said second hub shell end are coupled together by a freewheel.*

*37. The bicycle disc brake hub according to claim 35, wherein*

*said first axle end and said first hub shell end are rotatably coupled together by a first bearing assembly to rotate freely in both directions about said center axis of said hub axle, and*

*said second axle end and said second hub shell end are rotatably coupled together by a second bearing assembly to rotate freely in both directions about said center axis of said hub axle.*

*38. The bicycle disc brake hub according to claim 32, wherein*

*said first axle end and said first hub shell end are rotatably coupled together by a bearing assembly, and*

*said second axle end and said second hub shell end are coupled together by a freewheel.*

*39. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member, and*

*a locking ring having an opening with an inner peripheral surface, a center tubular section with second threads and an abutment flange extending outwardly from said center tubular section to form an axially facing retaining surface,*

*said at least one axially extending protrusion of said rotor mounting member including six axially extending protrusions configured to engage the disc brake rotor.*

*40. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member, and*

*a locking ring having an opening with an inner peripheral surface, a center tubular section with second threads and an abutment flange extending outwardly from said center tubular section to form an axially facing retaining surface,*

*said inner peripheral surface of said locking ring being non-circular.*

*41. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member, and*

*a locking ring having an opening with an inner peripheral surface, a center tubular section with second threads and an abutment flange extending outwardly from said center tubular section to foul! an axially facing retaining surface,*

*said inner peripheral surface of said locking ring having a plurality of projections extending radially inwardly therefrom.*

*42. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member, and*

*a locking ring having an opening with an inner peripheral surface, a center tubular section with second threads and an abutment flange extending outwardly from said center tubular section to form an axially facing retaining surface,*

*said first axle end and said first hub shell end being rotatably coupled together by a first bearing assembly to rotate freely in both directions about said center axis of said hub axle, and*

*said second axle end and said second hub shell end being rotatably coupled together by a second bearing assembly to rotate freely in both directions about said center axis of said hub axle.*

*43. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member, and*

*a locking ring having an opening with an inner peripheral surface, a center tubular section with second threads and an abutment flange extending outwardly from said center tubular section to form an axially facing retaining surface,*

*said first hub shell end having a first annular spoke flange with first spoke holes formed therein, and*

*said second hub shell end has a second annular spoke flange with second spoke holes formed therein.*

*44. A bicycle disc brake hub comprising:*

*a hub axle having a center axis extending in an axial direction between a first axle end and a second axle end;*

*a hub shell having first and second hub shell ends with said hub axle rotatably coupled to said hub shell, said first hub shell end having a brake rotor attachment portion including an annular surface with first threads that surrounds said first axle end of said hub axle;*

*a rotor mounting member being configured to be non-rotatably mounted on said first hub shell end, said rotor mounting member having at least one axially extending protrusion non-movably fixed thereto that is configured to engage a disc brake rotor, said at least one axially extending protrusion extending axially from an axially facing surface of said rotor mounting member;*

*a locking ring having an opening with an inner peripheral surface, a center tubular section with second threads and an abutment flange extending outwardly from said center tubular section to form an axially facing retaining surface; and*

*a nut disposed at said first axle end of said a hub axle, said nut having a maximum outer width and said inner peripheral surface of said locking ring having a minimum inner width that is greater than said maximum outer width of said nut.*

* * * * *